April 23, 1963
O. C. NIEDERER
3,086,754
CABLE-HANDLING EQUIPMENT
Filed July 1, 1960
4 Sheets-Sheet 1
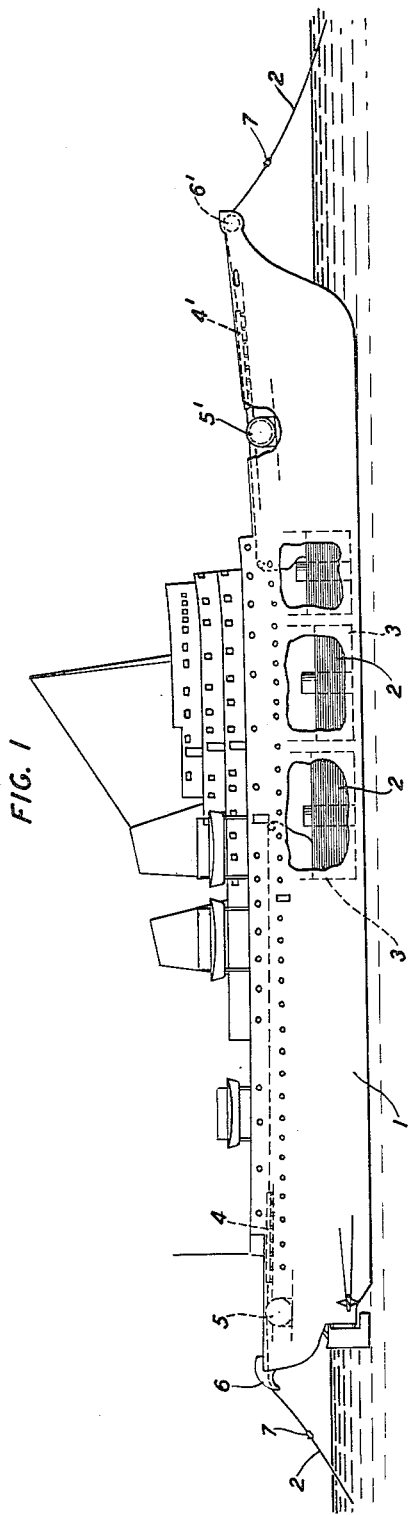
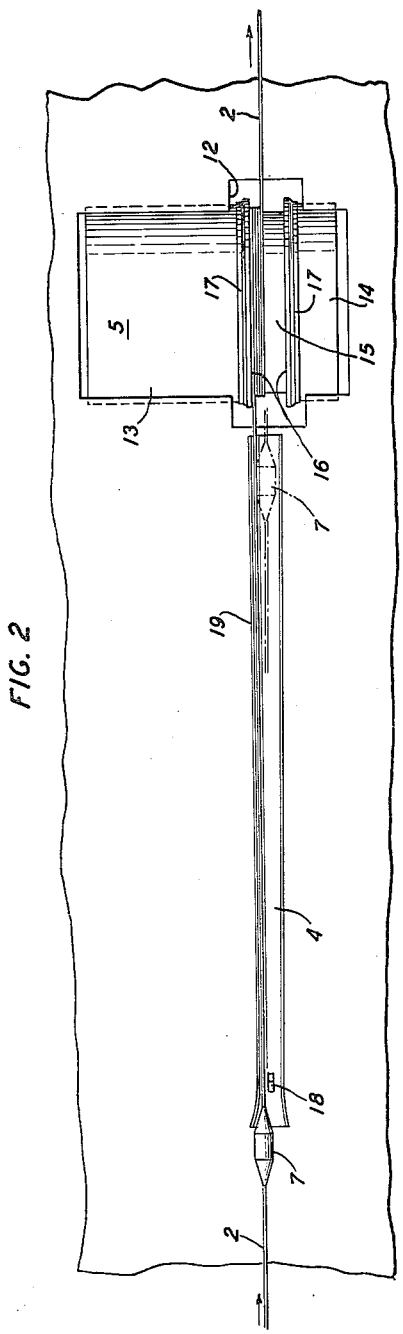
INVENTOR
O. C. NIEDERER
BY
*Stoddard*
ATTORNEY

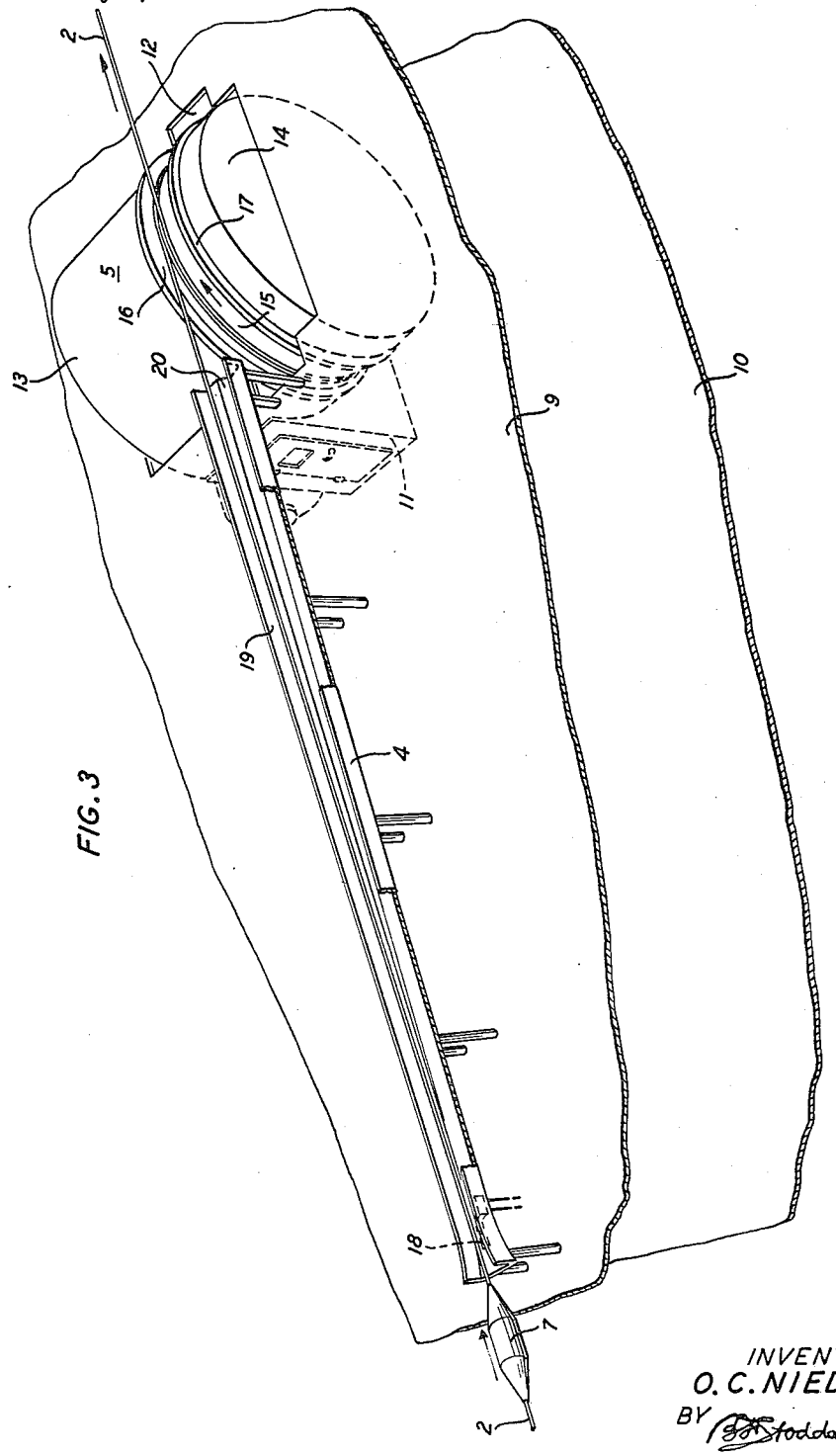

April 23, 1963 — O. C. NIEDERER — 3,086,754

CABLE-HANDLING EQUIPMENT

Filed July 1, 1960 — 4 Sheets-Sheet 3

INVENTOR
O. C. NIEDERER
BY Stoddard
ATTORNEY

April 23, 1963 — O. C. NIEDERER — 3,086,754
CABLE-HANDLING EQUIPMENT
Filed July 1, 1960 — 4 Sheets-Sheet 4

INVENTOR
O. C. NIEDERER
BY Stoddard
ATTORNEY

United States Patent Office 3,086,754
Patented Apr. 23, 1963

3,086,754
CABLE-HANDLING EQUIPMENT
Otto C. Niederer, Westfield, N.J., assignor to Bell Telephone Laboratories, Incorporated, New York, N.Y., a corporation of New York
Filed July 1, 1960, Ser. No. 40,253
3 Claims. (Cl. 254—134.3)

This invention relates to cable-handling equipment, and, more particularly, to improved spooling and fleeting apparatus for use in controlling the movement of a cable during cable-handling operations. The invention is especially useful for handling ocean communication cable of the armorless type provided integrally at spaced intervals with rigid instrumentality housing structures of markedly greater diameter than the cable.

One of the main functions of cable-handling equipment is to restrain or control the movement of a cable under two conditions. The first is the paying-out condition during which a cable is taken from a shipboard stowage area, where it is under negligible tension, and is conveyed overboard into the ocean, where it is under high tension due to the weight of the long length of cable extending from the ship to the bottom of the ocean. The other condition occurs during cable-retrieving operations and is the reverse of the first condition in that cable is pulled out of the ocean under high tension and is taken to a shipboard area where it is under substantially no tension.

Control and restraint of the movement of a cable can be accomplished by wrapping several turns of the cable around a large rotatable drum which, in turn, has its rate of rotation controlled by suitable means, such as driving or braking equipment. Since it is not ordinarily desirable for these cable wraps to be superimposed upon each other, overlapping of the cable wraps can be prevented by employing spooling and fleeting apparatus. The spooling function, as defined for the purposes of this invention, serves to move or guide a cable before it is fed onto a drum and can be accomplished by employing a guide for shifting the longitudinal axis of the cable with respect to the axis of the drum so that the oncoming cable will touch a different portion of the drum's surface than that previously engaged. The fleeting function serves to move or guide a cable while it is in contact with the peripheral surface of a drum. This function can be performed by utilizing means mounted in such a manner as to push the cable wraps in a lateral direction to permit the oncoming portion of the cable to be wrapped around a portion of the drum not covered by a previous cable wrap.

The operation of a drum-type cable-handling engine is complicated by the presence of lump-type instrumentality housing structures connected integrally into the cable at spaced intervals. The spacing between these lump-type housings varies with the type of cable used and may be fifty miles in some cases and ten miles in other instances. The housings may be of either flexible or rigid construction, and may be of various sizes. A recently developed armorless ocean communication cable, having a diameter of approximately one inch, employs rigid housings about four feet in length and having a diameter of approximately ten inches. Each of these housings has a weight of about five hundred pounds. If such relatively large and heavy housings are fed on to a cable-handling drum, special precautions must be taken to insure that the housings do not become superimposed upon the relatively small armorless cable, especially since the main component of this cable is a suitable plastic material, such as polyethylene, which might become crushed. Furthermore, overlapping of the cable would cause it to become snarled and knotted so that it will be unable to leave the drum.

Accordingly, an object of this invention is to provide improved cable-handling equipment for controlling the movement of a cable.

Another object of this invention is to provide an improved drum-type cable-handling engine.

A further object of this invention is to provide improved spooling and fleeting apparatus in cable-handling equipment.

An additional object is to provide a traversable drum for use in a cable-handling engine.

These and other objects of the invention are attained by providing a cable-handling engine with a rotatable drum having a fixed path of rotation. This drum is encompassed by a somewhat larger traversable drum which is coupled to the inner drum for rotation therewith. The coupling means include special bearings for permitting the outer drum to be moved back and forth with respect to the inner drum under the control of specially designed equipment. Cable is spooled on to the outer drum by means of a long trough having a portion of its floor provided with a dropped bottom for accommodating the housing structures connected in the cable. Fleeting is accomplished by a canted ring surrounding the outer drum.

These and other features of the invention are more fully discussed in connection with the following detailed description of an exemplary embodiment thereof with reference to the drawing in which:

FIG. 1 is a pictorial representation of a cable-handling ship equipped with cable stowage tanks and also with both bow and stern cable-handling equipment;

FIG. 2 is a top view of improved cable-handling equipment constructed in accordance with this invention;

FIG. 3 is a perspective view of the improved cable-handling equipment shown in FIG. 2;

Figure 6:
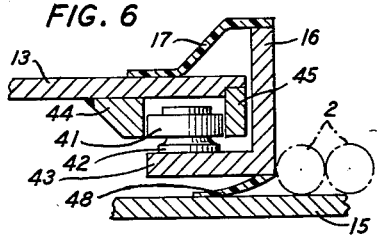
Figure 8:
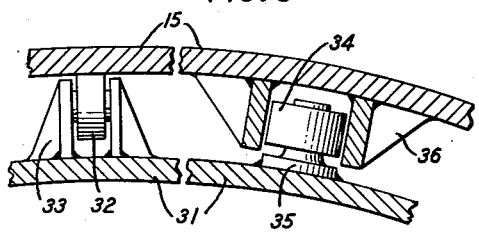
Figure 7:
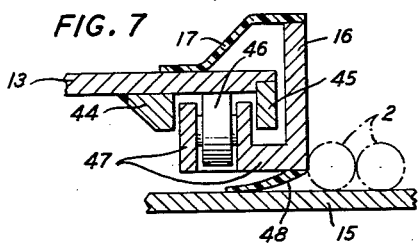
Figure 12:
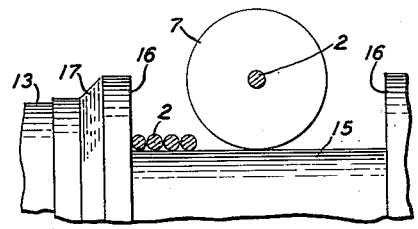
Figure 13:
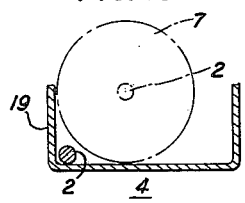
Figure 14:
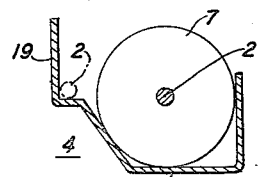

FIGS. 6, 7, and 8 are sectional views of detailed parts of the improved cable-handling drum;

FIGS. 9, 10, 11 and 12 are side views of a part of the top portion of the improved cable-handling drum and illustrate various positions which the cable wraps assume during the time that an instrumentality housing structure is on the drum; and FIGS. 13 and 14 are sectional end views of different portions of an improved guiding trough that is also shown in FIGS. 2 and 3.

In FIG. 1, a cable-handling ship 1 is represented as carrying ocean communication cable 2 coiled in stowage tanks 3 located in the ship's hold. During paying-out operations, the cable 2 travels out of its stowage tank 3 and passes through a guiding trough 4 near the stern of the ship 1. This trough 4 leads to a cable-handling engine 5 having a drum around which the cable 2 is wrapped several times. After leaving the engine 5, the cable 2 slides down an overboarding chute or sheave 6 and passes into the ocean. As is indicated in the drawing, the cable 2 is provided at spaced intervals with lump-type housing structures 7 connected integrally thereto. These housing structures 7 contain electric instrumentalities constituting such equipment as repeaters or equalizers. Hereinafter, in the following description, the housing structures 7 will, for the purpose of convenience, be referred to simply as repeaters.

Cable 2 that has been laid on the ocean floor occasionally requires repairs. In order to make these repairs, it is necessary to pull up, or retrieve, the cable 2. For this purpose, the ship 1 is provided near its bow with a similar trough 4' and drum-type cable-handling engine 5'. During retrieving operations, the cable 2 is pulled up out of the ocean and passes over a bow sheave 6. From here, the cable 2 travels through the trough 4' which guides the cable 2 on to the drum of the engine 5' around which it is wrapped several times. After leaving the engine 5', the cable 2 is coiled in its stowage tank 3. Since the troughs 4 and 4' are similar and since the engines 5 and 5' are also similar, the following description will be confined, for the purpose of simplicity, to the trough 4 and its associated engine 5.

Referring now to FIGS. 2 and 3, the trough 4 is mounted on the upper deck 9 of the ship 1, and the engine 5 is supported on the main deck 10. The supports for the engine 5 are located in an engine room 11 and are such as to raise it about two feet above the main deck 10. Since the engine 5 has a diameter of about ten feet, its upper portion protrudes for a distance of three or four feet through an opening 12 cut in the upper deck 9.

The external periphery of the engine 5 comprises two stationary cylindrical end portions 13 and 14 and a rotatable cylindrical middle portion 15. At each line of separation between the portions 13, 14 and 15, fleeting rings 16 are mounted for rotation around the middle portion 15. These lines of separation are covered by rubber flanges 17 attached to the fleeting rings 16 for rotation therewith.

The trough 4 is mounted in such a manner that its longitudinal axis is in line with the center of the rotatable middle portion 15 of the engine 5. The width of the trough 4 is slightly larger than the diameter of a repeater 7 in order to permit the repeaters 7 to slide freely therein. However, the width of the trough 4 is sufficiently narrow for guiding the repeaters 7 steadily along their path of travel without wobbling. The end of the trough 4 that is farthest from the engine 5 is flared for the purpose of facilitating the entry of the repeaters 7. Near this flared end, a pressure switch 18 is mounted in the bottom of the trough 4. This switch is adapted to be momentarily actuated by the weight of the repeaters 7 in passing thereover.

The cable 2 is taken from its stowage tanks 3 and is guided on to the trough 4 in such a manner that it normally slides against the rear wall 19 of the trough 4 as is represented in the drawing. Since the cable 2 is attached to the centers of the end portions of the repeaters 7, it will be pulled away from the wall 19 and will be moved toward the center of the trough 4 whenever a repeater 7 travels through the trough 4. Since the repeaters 7 also lift the cable 2 up off the floor of the trough 4, a portion 20 of the floor of the trough 4 at its end near the engine 5 is dropped, or slanted in the manner of a chute, to a maximum depth approximately equal to the radius of a repeater 7. This enables the cable 2 to be applied to the engine 5 at the same horizontal level that is used when no repeater 7 is present.

This can be better understood by referring to FIGS. 13 and 14. FIG. 13 is a cross-sectional view of the trough 4 taken near the pressure switch 18. At this point, the floor of the trough 4 is flat and the cable 2 is represented as being in its normal position against the wall 19. A repeater 7 is indicated in broken lines to show that the portion of the cable 2 attached thereto is in a position that is an appreciable distance away from the wall 19 and is also an equal distance above the floor of the trough 4. FIG. 14 is a cross-sectional view of the trough 4 taken near the engine 5. It can be seen in FIG. 14, that the portion 20 of the floor of the trough 4 is dropped sufficiently to enable the portion of the cable 2 that is attached to a repeater 7 to be at the same horizontal level as the normal position, indicated by broken lines, of the cable 2.

Figure 4:
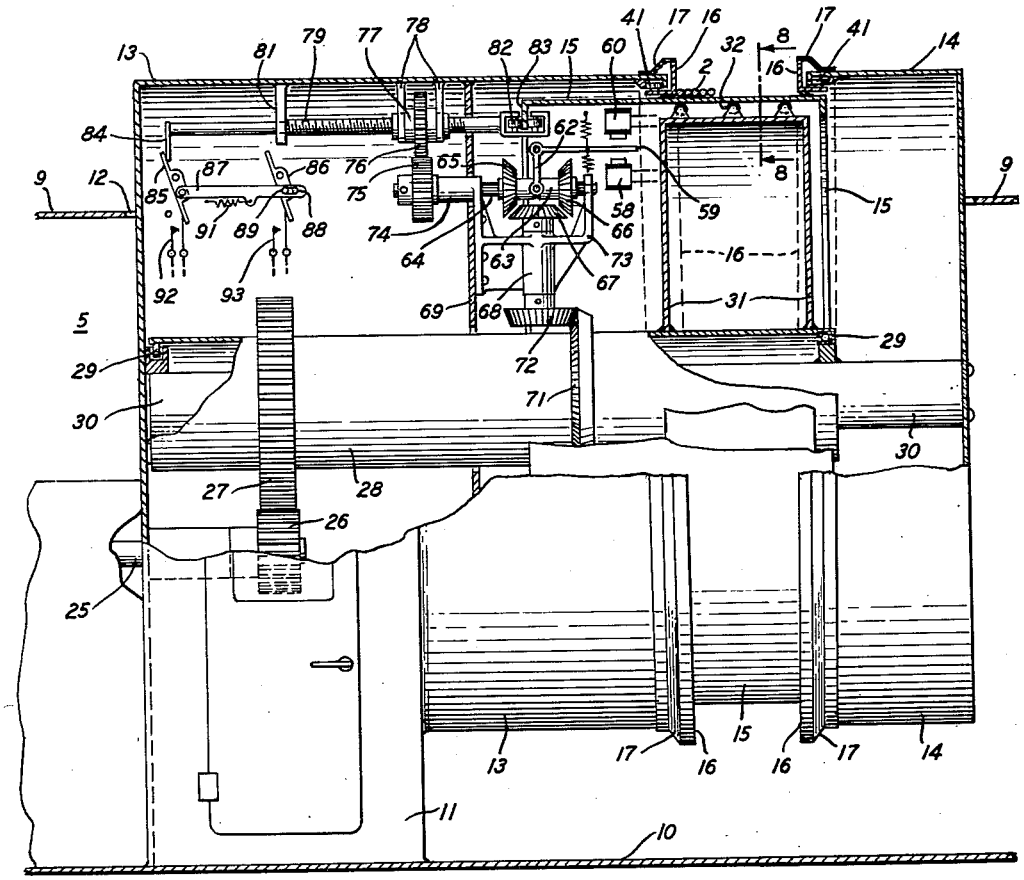
FIG. 4 is a side view partly in section of an improved cable-handling drum constructed in accordance with this invention.

Returning now to the construction of the engine 5, which is best seen in FIG. 4, the power for operating the engine 5 is supplied by a drive shaft 25 which is driven from a suitable source of power, such as a motor. The end of the shaft 25 carries a small gear 26 which meshes with a large gear 27 fixedly fastened to a long rotatable cylinder 28. This cylinder 28 is supported for rotation on bearings 29 mounted on a long supporting cylinder 30 which does not rotate. The cylinder 28 has a large cylindrical drum 31 mounted securely thereon for rotation therewith. This drum 31 is surrounded by a still larger cylindrical drum which is the rotatable portion 15 referred to above. The radius of this outer drum 15 is at least as large as the radius of a circle defining the limit of curvature to which the cable 2 may be subjected without damage thereto. The outer drum 15 is coupled to the inner drum 31 by two types of bearings which are shown in detail in FIG. 8.

In FIG. 8, which is a cross-sectional view taken along the line 8—8 in FIG. 4, one type of bearing includes a rotatable wheel 32 mounted on brackets 33 fastened to the outer surface of the inner drum 31. The wheels 32 are adapted to rotate on the inner surface of the outer drum 15. The other type of bearing comprises a rotatable wheel 34 mounted on a support 35 fastened to the outer surface of the inner drum 31. These wheels 34 are adapted to rotate against guide members 36 which are fastened to the inner surface of the outer drum 15. The construction of these two types of bearings is such as to support the outer drum 15 on the inner drum 31 in a manner which causes the outer drum 15 to be rotated when the inner drum 31 rotates. In addition, these bearings enable the outer drum 15 to be shifted or moved back and forth in a direction parallel to its axis. Thus, the outer drum 15 is, in effect, a traversable drum.

As was stated above, the external periphery of the engine 5 includes, in addition to the middle rotatable cylindrical surface constituted by the traversable drum 15, two stationary cylindrical end portions 13 and 14. These portions 13 and 14 serve to support the fleeting rings 16, as is described hereinafter, and also function to enclose the other components of the engine 5 as a protection for personnel. These portions 13 and 14 are so mounted as to be about two feet above the main deck 10, as was stated above. This serves to provide personnel with convenient access to the bottom of the traversable drum 15 when required.

The cable engine 5 also includes two fleeting rings 16 that were mentioned above. These fleeting rings 16 encircle the traversable drum 15 and are positioned at opposite sides of the space between the stationary members 13 and 14 to which they are coupled by two types of bearings which are shown in detail in FIGS. 6 and 7. The type of bearing shown in FIG. 6 includes a wheel 41 rotatably mounted on a spindle 42 fastened to a bracketlike portion 43 of the left fleeting ring 16. The wheel 41 is adapted to turn against a bracket 44 and a rim member 45, both of which are fastened to the stationary member 13 for forming a bearing track for the wheels 41. The other type of bearing, which is shown in FIG. 7, comprises a wheel 46 rotatably mounted on a shaft held by a bracket-like extension 47 of the left fleeting ring 16. The extension 47 is so positioned as to fit between the bracket 44 and the rim member 45, both of which, as was stated above, are fastened to the stationary member 13. This permits the wheel 46 to rotate against the inside surface of the stationary member 13.

Although FIGS. 6 and 7 do not show the coupling of the right fleeting ring 16 to the other stationary member 14, it is to be understood that this coupling is performed by bearings similar to those illustrated in FIGS. 6 and 7. These two types of bearings enable the fleeting rings 16 to rotate around the traversable drum 15 independently thereof and also independently of each other.

As a protection against the entrance of dirt and water, the fleeting rings 16 are provided with an exterior flange or flap-like member 17, as was stated above and, in addition, an interior flap-like member 48. Both of the members 17 and 48 are made of a suitable flexible material, such as rubber. The members 17 are attached to the outer edges of the fleeting rings 16 and bear against the exterior surfaces of the stationary members 13 and 14. The members 48 are attached to the bottom edges of the fleeting rings 16 and bear against the exterior surface of the traversable drum 15. Thus, when the fleeting rings rotate, they carry with them the flaps 17 and 48. Although FIGS. 6 and 7 show the bearings and flaps for only the left fleeting ring 16, it is to be understood that the right fleeting ring 16 is similarly equipped as is indicated in FIG. 4.

These fleeting rings 16 are not driven by any motor-operated means. Instead, they are driven by the frictional force exerted by the rotating cable. This can be understood from the following explanation. The cable 2 travels against the wall 19 of the trough 4 which is so positioned that, when the cable 2 is applied to the traversable drum 15, the cable 2 abuts tightly or snugly against the left fleeting ring 16 as is indicated by the broken lines in FIGS. 6 and 7. The cable 2 is then tightly wrapped around the circumferential periphery of the traversable drum 15 a number of times. The resulting frictional engagement between these cable wraps, which may be four or five in number, and the surface of the drum is sufficient to force the cable 2 to rotate with the drum 15 or vice versa. Due to the fact that the cable 2 abuts against the fleeting ring 16, there is also frictional engagement between them and this is sufficient to effect the rotation of the left fleeting ring 16. In other words, the rotation of the drum 15 causes the cable wraps to rotate and these, in turn, drag along with them the left fleeting ring 16.

At this point, it should be explained that only one of the fleeting rings 16 is usefully employed at any one time. This is due to the fact that the drive shaft 25 can be reversibly operated so that the engine 5 can function either as a brake during cable-laying operations or as a pulling force during cable-retrieving operations. It is to be understood that there may be occasions during cable-laying operations when the engine 5 would function as a driving force for pulling the cable 2 from its stowage tanks 3 either at the start of cable-laying operations or during periods when the weight of the overboarded portion of the cable 2 is not sufficient to pull itself forward. Therefore, during laying operations, the left fleeting ring 16 moves the cable 2 laterally whereas, during retrieving operations, the right fleeting ring 16 functions to shove the cable wraps across the surface of the traversable drum 15. If the retrieving operations are of any considerable duration, it would be desirable to employ a duplicate trough 4 which should be similarly located near the other side of the engine 5.

Since the trough 4 directs the cable 2 to a point on the drum 15 adjacent to the left fleeting ring 16, it can be understood that, when the first cable wrap is nearly completed, it must be moved to the right as, otherwise, the oncoming cable 2 from the trough 4 would become superimposed thereon. This transverse or lateral movement of the cable wraps is accomplished by canting or slanting the fleeting rings 16. However, it should be noted that the fleeting rings 16 are slanted in opposite directions. For example, in the position illustrated in FIG. 4, the fleeting rings 16 are tilted in such a manner that their top portions lean away from each other. In other words, the bottom portions of the fleeting rings 16 are closer together than their top portions are.

The extent or degree of this cant is at least equal to the diameter of the cable 2. Thus, if a perpendicular line should be dropped from the top of either one of the fleeting rings 16, it would fall at a point which is spaced apart from the bottom edge of the ring 16 by a distance at least equal to the diameter of the cable 2. This cant is obtained by so positioning the brackets 44 and rim members 45, which together form bearing tracks for the wheels 41 and 46, that they are disposed in a slanting manner along the interior surfaces of the stationary members 13 and 14.

Thus, the rotation of either of the fleeting rings 16 will function in the manner of a wedge to shove or push the wrapped cable 2 toward the opposite side of the traversable drum 15. This serves to clear a space on the drum 15 so that the oncoming cable 2 will not be superimposed upon the cable 2 that is already wrapped around the drum 15. As was stated above, this operation is defined as fleeting the cable 2.

Figure 5:
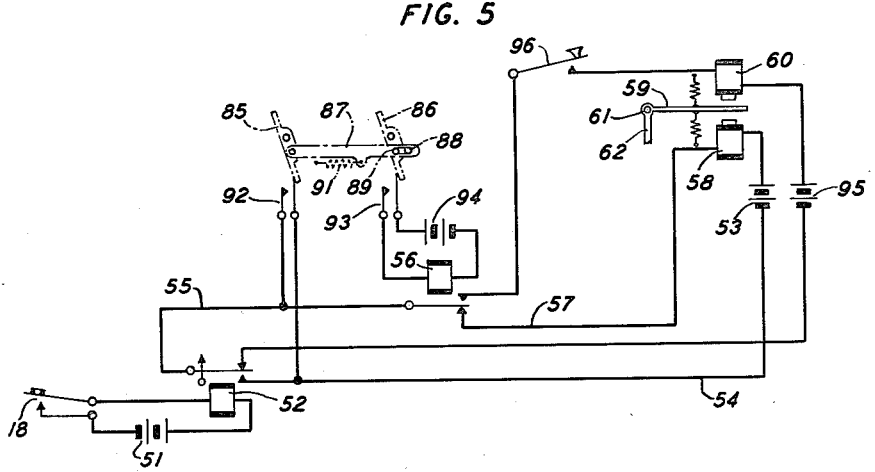
FIG. 5 is a diagram of a circuit for controlling the operation of the improved cable-handling drum shown in FIG. 4.

When a repeater 7 arrives upon the trough 4, its weight momentarily actuates the pressure switch 18, as was explained above. This switch 18 is part of a control circuit that is shown in detail in FIG. 5. In FIG. 5, it can be seen that the pressure switch 18 controls the application of electric current from a battery 51 to a relay 52. Normally, the switch 18 is open so that the relay 52 is not energized. When the switch 18 is momentarily closed by the passage of a repeater 7, current from battery 51 causes relay 52 to operate its armature which is of the slow-to-release type.

In response to the operation of the armature of relay 52, current will flow from a battery 53, along a lead 54, over the operated armature of relay 52, along a lead 55, over the released armature of another relay 56, and then along a lead 57 to one side of the winding of an electromagnet 58 which has its other side connected to the battery 53. The armature 59 of the electromagnet 58 is shared by another electromagnet 60. When neither of the electromagnets 58 and 60 is energized, their armature 59 is spring-biased to a position mid-way between them. Upon being energized, the electromagnet 58 pulls its armature 59 downward. In so doing, the armature 59 moves on its pivot 61 whereby moving to the left the bottom end of its extension arm 62 which is best shown in FIG. 4.

In FIG. 4, it can be seen that the bottom of the extension arm 62 is attached to a pin located mid-way on a sleeve 63 surrounding a splined shaft 64. This shaft 64 has two miter gears 65 and 66 oppositely mounted thereon for rotation therewith. These miter gears 65 and 66 are separated by the sleeve 63 and are adapted to alternatively engage a mating miter gear 67 horizontally mounted on a vertical shaft for rotation therewith. This vertical shaft is supported within a sleeve 68 which is attached to a stationary supporting wall or partition 69 having a hole therein for freely admitting the rotatable cylinder 28.

The cylinder 28 has attached to it for rotation therewith a large miter gear 71 which is adapted to mate with another miter gear 72 fastened to the bottom of the vertical shaft held within the sleeve 68. The sleeve 68 has an extension arm or bracket 73 for supporting one end of the splined shaft 64. The other end of the splined shaft 64 is enclosed within a sleeve 74 wherein it is coupled to a gear 75 for rotation therewith. This construction is so arranged as to permit the splined shaft 64 to be moved back and forth along its longitudinal axis by the extension arm 62 while still maintaining an operative coupling for effecting the rotation of the gear 75.

Mounted directly above the gear 75 is another gear 76 which mates therewith. The gear 76 is affixed to a nut 77 mounted for rotation between two journaled brackets 78 fastened to the inside of the top of the stationary member 13. A long lead screw 79 is threaded within the nut 77 and has its left portion supported by a journaled bearing in a bracket 81 fastened to the inside of the top of the member 13. The right portion of the lead screw 79 passes through a bushing in the stationary partition 69. The right end of the lead screw 79 has affixed thereto bearings 82 which engage both sides of a circumferential flange 83 on the traversable drum 15. The bearings 82 are so constructed and arranged as to permit the movement therein of the flange 83 when the drum 15 rotates. Accordingly, when the rotation of the nut 77 feeds the lead screw 79 to the right, it will force the drum 15 to also move toward the right. When the rotation of the nut 77 feeds the lead screw 79 to the left, it will, by acting on the flange 83, pull the drum 15 toward the left. In this manner, the traversable drum 15 is caused to move back and forth along the direction of its axis.

The left end of the lead screw 79 has a short arm 84 secured thereto for alternatively actuating two toggle switches 85 and 86. An operating arm 87 has one end attached to the toggle switch 85. The other end of the arm 87 is provided with a slot 88 adapted to receive a pin 89 which is fastened to the other toggle switch 86. A small spring 91 is provided for biasing the arm 87 toward the left. A set of spring contacts 92 is adapted to be actuated by the toggle switch 85 and a similar set of spring contacts 93 is adapted to be operated by the other toggle switch 86.

The toggle switches 85 and 86 and their contacts 92 and 93 are also shown in FIG. 5 wherein it can be seen that the contacts 92 control an obvious shunt path across the leads 54 and 55. It can also be seen that the contacts 93 control the application of current from a battery 94 to the relay 56. The control circuit shown in FIG. 5 also includes a battery 95 having one side connected to the break contact of the relay 52 and having its other side connected to one side of the energizing winding of the electromagnet 60. The other side of this winding is connected to the contact of a normally open switch 96 which is manually operable for initiating the return movement of the traversable drum 15.

Returning now to the occasion when the passage of a repeater 7 along the trough 4 momentarily actuated the pressure switch 18 to energize the relay 52, it was explained above how this, in turn, effected the energization of the electromagnet 58 which, in pulling down its armature 59, caused the extension arm 62 to be swung to the left. This movement causes the splined shaft 64 to also move to the left thereby bringing the miter gear 66 into engagement with the horizontal miter gear 67. The miter gear 67 is driven through the gears 71 and 72 by the same power that is effecting the rotation of the drums 15 and 31. Therefore, the miter gear 67 will now drive the gear 66 which will drive the splined shaft 64. The shaft 64 will, in turn, drive the gears 75 and 76. This rotates the nut 77 in the direction for effecting the movement of the lead screw 79 to the right.

When the lead screw 79 has moved a short distance to the right, its arm 84 moves sufficiently to allow the spring 91 to pull the arm 87 to the left thereby causing the toggle switch 85 to close its associated set of contacts 92. It should be noted that this movement of the arm 87 causes its slot 88 to slide along the pin 89 without changing the position of the other toggle switch 86. The closure of the contacts 92 closes an obvious shunt or bridging path across the leads 54 and 55. As this is timed to occur shortly before the slow-to-release armature of relay 52 moves away from its make contact, the electromagnet 58 remains in its energized condition.

The lead screw 79 continues to move to the right with its bearings 82 pushing against the flange 83 and thereby forcing the traversable drum 15 to the right. In thus moving to the right, the drum 15 carries with it the turns of the cable 2 that are wrapped around it. By the time that the drum 15 has moved sufficiently for the cable wraps to be carried over to the right fleeting ring 16, the arm 84 will have been carried by the lead screw 79 toward the right a sufficient distance to engage and operate the other toggle switch 86. This movement of the toggle switch 86 causes its pin 89 to move to the left in its slot 88. The operation of the toggle switch 86 closes the contacts 93 thereby energizing relay 56 with current from the battery 94.

Upon being energized, relay 56 operates its armature and thus opens the energizing circuit of the electromagnet 58 which, accordingly, releases its armature 59. The armature 59 now returns to its neutral position and, in so doing, moves its extension arm 62 to its neutral position. This disconnects the miter gear 66 from its mating engagement with the horizontal miter gear 67. This causes a cessation of movement of the nut 77 and the lead screw 79 with the result that the shifting movement of the traversable drum 15 is terminated. Accordingly, the drum 15 continues its rotation in this new location during the time that the repeater 7 is being payed out.

After the repeater 7 has been payed out, the drum 15 should be shifted to the left along its axis and returned to its original position. This can be performed by manually operating the drum-return switch 96. It is to be understood that, if desired, the switch 96 can be designed to be closed automatically by the repeater 7 after it has left the engine 5. This can be accomplished by making the switch 96 in the form of a trip switch or pressure switch similar to the switch 18 and placing it in the path of egress of the repeater 7. In either case, closure of the switch 96, completes the circuit for energizing the electromagnet 60. It should be noted that a portion of this energizing circuit was previously closed when the relay 56 operated its armature into engagement with its make contact.

When the electromagnet 60 becomes energized, it attracts the armature 59 upward thereby causing its extension arm 62 to move to the right. This brings the miter gear 65 into mating engagement with the horizontal miter gear 67 thereby reversing the direction of rotation of the gears 75 and 76. The nut 77 now rotates in the opposite direction and, consequently, drives the lead screw 79 to the left. The bearings 82, which are attached to the lead screw 79, will now pull the drum 15 back toward the left. The arm 84 also moves to the left and out of engagement with the right toggle switch 86. However, the toggle switch 86 remains in its present position since, at this time, there is no force acting to restore it.

As the lead screw 79 reaches its original position it engages the left toggle switch 85 and moves it to the position shown in FIG. 4. In moving to this position, the toggle switch 85 pushes the arm 87 to the right. Since the pin 89 is, at this time, in engagement with the left end of the slot 88, the movement of the arm 87 to the right will force the toggle switch 86 to return to its original position. This disconnects the battery 94 from the relay 56 which, consequently, releases its armature thereby opening the energizing circiut of the electromagnet 60. The electromagnet 60 thereupon releases the armature 59 which moves its extension arm 62 to its neutral position. This places the miter gears 65 and 66 in their neutral positions with the result that the shifting movement of the drum 15 is terminated. Thus, the equipment is restored to its original condition.

Figure 9:
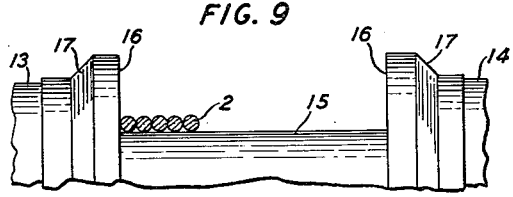

The manner in which a repeater 7 is handled by the engine 5 will now be discussed with particular reference to FIGS. 9, 10, 11 and 12. In FIG. 9, the cable 2 is shown in its normal position on the traversable drum 15. In this illustration, there are five cable wraps which make four complete turns around the drum 15. Although these cable wraps actually go around the surface of the drum 15, they are here shown in section for the purpose of simplicity. In the position shown in FIG. 9, the cable wrap on the right is ready to leave the drum 15. The cable wrap at the left has just been applied to the drum 15 from the trough 4 and abuts against the left fleeting ring 16. During the operation of the equipment, the cable wraps are continuously shoved toward the right by the fleeting ring 16 in order to clear a space for the oncoming cable 2 to be applied to the surface of the drum 15.

When a repeater 7 enters the trough 4, it operates the pressure switch 18 which causes the drum 15 to be shifted toward the right by a distance approximately sufficient to cause the cable wrap at the right to abut against the right fleeting ring 16. The repeater 7 is then fed on to the middle portion of the drum 15 so that it is about half-way between the two fleeting rings 16. This centering of the repeaters 7 is controlled by the dropped portion 20 of the floor of the trough 4 because its right wall and its slanted wall are so located as to function as centering guide means.

As the repeater slides into this portion of the trough, the leading portion of the cable 2, which is attached to the nose of the repeater 7, is pulled away from the rear wall 19 of the trough 4 and is moved toward the center of the trough 4. Thus, the cable 2 is spooled in that its longitudinal axis is shifted with respect to the axis of the drum so that the oncoming cable will meet the drum 15 at a different tangential point than it formerly did.

Figure 10:
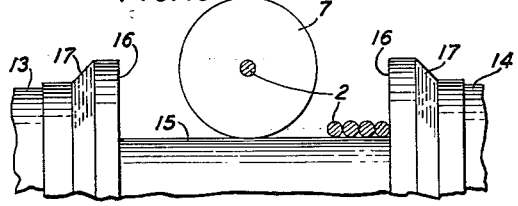
Figure 11:
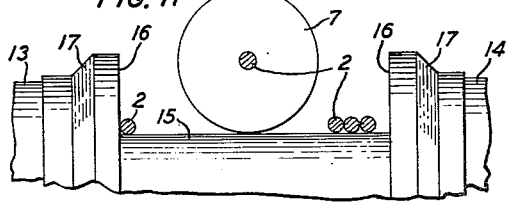

By the time that the repeater 7 engages the surface of the drum 15, the cable wrap at the extreme right will have been fed off the drum 15 with the result that there will now be only four cable wraps between the repeater 7 and the right fleeting ring 16 as is shown in FIG. 10. When the drum 15 makes another complete rotation, another cable wrap at the extreme right of the repeater 7 will have been removed as is represented in FIG. 11. At the same time, a new cable wrap will be applied against the left fleeting ring 16. This new cable wrap takes this position because, when the repeater 7 leaves the trough 4, the trailing portion of the cable 2 tends to move back to its original position against the rear wall 19 of the trough 4 since the cable 2 is normally guided from its stowage tank 3 into this position as was explained above.

After three more complete rotations of the drum 15, all the cable wraps at the right of the repeater 7 will have been fed off the drum 15 and there will be four new cable wraps at the left of the repeater 7 as is illustrated in FIG. 12. These new cable wraps will have each been fleeted in succession by the fleeting ring 16 to provide a clear space for the oncoming cable 2 as was described above. During these operations, the repeater 7 remains on the center portion of the drum 15 and is not fleeted. After the repeater 7 has been payed out, the traversable drum 15 is shifted toward the left thereby returning to its original position in the manner described above.

What is claimed is:

1. Equipment for handling cable having connected therein at intervals instrumentality housings of markedly greater diameter than the cable, said equipment comprising a large drum having a width more than sufficient for receiving thereon a number of turns of said cable wrapped therearound, said drum having a first position adapted for receiving cable thereon, said drum having a second position adapted for receiving an instrumentality housing thereon, driving means for rotating said drum in both of said positions, sensing means adapted for sensing the approach to said drum of an instrumentality housing, shifting means adapted to be operated by said sensing means for moving said drum from said first position to said second position, and control means for effecting the return of said drum from said second position to said first position.

2. Equipment for handling ocean cable integrally provided at spaced intervals with lump-type instrumentality housings of markedly greater diameter than the cable, said equipment comprising a first large drum having a radius at least as large as the radius of a circle defining the limit of curvature to which said cable may be subjected without damage thereto, said drum having a width more than sufficient for holding several turns of said cable wrapped around its periphery with none of the turns superimposed on any of the other turns, a second drum having a radius slightly smaller than the radius of said first drum, means for mounting said second drum for rotation completely within said first drum, means on said second drum for supporting said first drum for rotation therewith, sensing means adapted for sensing the approach to said first drum of an instrumentality housing, and shifting means adapted to be operated by said sensing means for temporarily shifting said first drum axially with respect to said second drum.

3. Cable-handling apparatus for handling cable having instrumentality housings connected therein at spaced intervals, said apparatus comprising a rotatable drum having a peripheral surface adapted for receiving thereon said cable and said instrumentality housings, and guiding means adapted for applying said cable to a first portion of said peripheral surface, said guiding means also being adapted for applying said instrumentality housings to a second portion of said peripheral surface, said guiding means including a longitudinal trough having its axis disposed in a plane perpendicular to a plane passing through the axis of said cylinder, said trough having a straight wall for defining a tangential path to said first portion of said peripheral surface, and said trough having a floor with a dropped portion therein for defining a tangential path to said second portion of said peripheral surface.

References Cited in the file of this patent

UNITED STATES PATENTS

| 652,893 | Herdman | July 3, 1900 |
| 1,670,993 | Smith et al. | May 22, 1928 |
| 1,811,623 | Ferguson | June 23, 1931 |
| 2,144,635 | Norton | Jan. 24, 1939 |
| 2,757,884 | Bryant et al. | Aug. 7, 1956 |
| 2,766,041 | Teplitz | Oct. 9, 1956 |

FOREIGN PATENTS

| 578,742 | Germany | June 17, 1933 |
| 563,018 | Great Britain | July 16, 1943 |
| 1,213,717 | France | Nov. 2, 1959 |